United States Patent
Li et al.

(10) Patent No.: US 10,841,043 B2
(45) Date of Patent: Nov. 17, 2020

(54) METHOD AND APPARATUS FOR TRANSMITTING ACKNOWLEDGEMENT/ NONACKNOWLEDGEMENT SIGNALS IN A WIRELESS COMMUNICATION SYSTEM

(75) Inventors: Yingyang Li, Beijing (CN); Jingxing Fu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 33 days.

(21) Appl. No.: 13/451,954

(22) Filed: Apr. 20, 2012

(65) Prior Publication Data

US 2012/0269179 A1    Oct. 25, 2012

(30) Foreign Application Priority Data

Apr. 22, 2011 (CN) ............ 2011 1 0111614

(51) Int. Cl.
  *H04W 72/12*   (2009.01)
  *H04L 1/18*    (2006.01)

(52) U.S. Cl.
  CPC ................ *H04L 1/1854* (2013.01)

(58) Field of Classification Search
  USPC ........................................ 370/280, 328, 248
  See application file for complete search history.

(56) References Cited

U.S. PATENT DOCUMENTS

| | | | | |
|---|---|---|---|---|
| 2011/0176461 A1* | 7/2011 | Astely | ........... | H04B 7/2656 370/280 |
| 2012/0069798 A1* | 3/2012 | Vitthaladevuni et al. | .... | 370/328 |
| 2012/0257513 A1* | 10/2012 | Yamada | ........... | H04L 1/0618 370/248 |
| 2013/0044653 A1* | 2/2013 | Yang et al. | ........... | 370/280 |
| 2014/0016594 A1* | 1/2014 | Han | ........... | H04L 5/001 370/329 |
| 2014/0029489 A1* | 1/2014 | Han | ........... | H04L 1/1812 370/280 |
| 2014/0036889 A1* | 2/2014 | Kim | ........... | H04L 1/1854 370/336 |

FOREIGN PATENT DOCUMENTS

| | | |
|---|---|---|
| EP | 2200208 A1 | 6/2010 |
| WO | 2011/041623 A1 | 4/2011 |

OTHER PUBLICATIONS

3GPP TSG RAN WG1 Meeting #62bis, R1-105153, "Resource Allocation for PUCCH Format 3", CATT. Oct. 11-15, 2010, pp. 1-2.
(Continued)

*Primary Examiner* — Kevin C. Harper
*Assistant Examiner* — Derrick V Rose
(74) *Attorney, Agent, or Firm* — Jefferson IP Law, LLP

(57) ABSTRACT

A method for transmitting Acknowledgement/Non-Acknowledgement (ACK/NACK) signals by a User Equipment (UE) in a wireless communication system using Carrier Aggregation (CA) is provided. The method includes receiving, from a base station, information on a Primary Cell (Pcell) and a Secondary Cell (Scell), determining a timing position for transmitting the ACK/NACK signals based on the received information, and transmitting, to the base station, the ACK/NACK signals in the determined timing position.

17 Claims, 4 Drawing Sheets

(56) References Cited

OTHER PUBLICATIONS

3GPP TSG RAN WG1 Meeting #63, R1-106099, "ACK/NACK on PUCCH for TDD", LG Electronics, Oct. 15-19, 2010, pp. 3-6.
CATT; Resource Allocation for PUCCH Format 3; XP050450371; R1-105153; 3GPP TSG RAN WG1 Meeting #62bis; Oct. 11-15, 2010; Xi'an, China.
Motorola; Introduction of Rel-10LTE-Advanced features in 36.213; XP050469903; 3GPP TSG-RAN Meeting #63; Nov. 15-19, 2010; Jacksonville, FL.
Ericsson, ST-Ericsson; Remaining issues in general frame work for aggregation of carriers with different UL/DL configurations; XP050562653; R1-120070; 3GPP TSG-RAN WG1 #68; Feb. 6-10, 2012; Dresden, Germany.
Korean Office Action dated Mar. 5, 2019, issued in counterpart Korean application No. 10-2012-0042054.
Renesas Electronics Europe; Operation Principles of CC specific TDD Configuration; 3GPP TSG-RAN WG2 Meeting #73bis; R2-111983; Apr. 11-15, 2011; Shanghai, China.
Korean Office Action dated Oct. 17, 2018; Korean Appln. No. 10-2012-0042054.

* cited by examiner

METHOD AND APPARATUS FOR TRANSMITTING ACKNOWLEDGEMENT/ NONACKNOWLEDGEMENT SIGNALS IN A WIRELESS COMMUNICATION SYSTEM

PRIORITY

This application claims the benefit under 35 U.S.C. § 119(a) of a Chinese patent application filed in the Chinese Patent Office on Apr. 22, 2011 and assigned Serial No. 201110111614.3, the entire disclosure of which is hereby incorporated by reference.

BACKGROUND OF THE INVENTION

1. Field of the Invention

The present invention relates to a wireless communication system. More particularly, the present invention relates to a method and an apparatus for transmitting Acknowledgement/Non-Acknowledgement (ACK/NACK) signals in a Time Division Duplexing (TDD) system supporting Carrier Aggregation (CA).

2. Description of the Related Art

Long Term Evolution (LTE) technology supports a Time Division Duplexing (TDD) mode.

FIG. 1 is a diagram illustrating frame structure of a TDD system according to the related art.

Referring to FIG. 1, a length of each radio frame (100) is 10 ms and each radio frame (100) is divided into two half-frames (102) of 5 ms. Each of the two half-frames (102) comprises a subframe (106) of 1 ms including 8 time slots of 0.5 ms and 3 special fields. The 3 special fields are respectively Downlink Pilot Time Slot (DwPTS), Guard Period (GP) and Uplink Pilot Time Slot (UpPTS). Two continuous time slots are defined as one subframe.

Transmission in a TDD system includes transmission from the base station to User Equipment (UE) (called downlink) and transmission from UE to the base station (called uplink). Based on the frame structure shown in FIG. 1, uplink and downlink share 10 subframes within every 10 ms, and each subframe is configured either for uplink or for downlink. Subframes configured for uplink are called uplink subframes and those configured for downlink are called downlink subframes. A TDD system supports seven kinds of uplink and downlink configurations, as shown in Table 1. In Table 1, D denotes a downlink subframe, U denotes an uplink subframe, and S denotes a special subframe comprising three special fields.

A LTE TDD system supports Hybrid Automatic Repeat Request (HARQ) mechanism. According to the basic principle of the HARQ mechanism, the base station transmits data to allocate uplink resources for UE, the UE returns an ACK signal (ACK) upon successful reception of the data and returns a NACK signal (NACK) upon unsuccessful reception of the data. The base station transmits downlink data in the Physical Downlink Shared Channel (PDSCH), and transmits the schedule and control information of PDSCH or other control signals, such as SPS release signaling, in the Physical Downlink Control Channel (PDCCH). The UE determines the demodulation and decoding of PDSCH according to the decoding result of PDCCH. The PDCCH in a downlink subframe is used to schedule the PDSCH in this subframe. Because of the asymmetry of the uplink and downlink in TDD system, the ACK/NACK of PDSCH or PDCCH in multiple downlink subframes and the PDCCH in an uplink subframe could be fed back in an uplink subframe of the ACK/NACK of PDSCH or PDCCH in multiple downlink subframes.

Assuming that the index of downlink subframe is n−k, wherein k belongs to set K, and the index of uplink subframe is n, Table 2 shows set K with different uplink/downlink configurations. Taking the situation that the uplink/downlink configuration number is 0 and the subframe with index 5 is a downlink subframe as an example, to ensure that the shortest duration of UE processing data in LTE is 4 ms, the time between the timing position of downlink subframe and the corresponding timing position for transmitting ACK/NACK should be longer than 4 ms. Accordingly, to fit that condition, the value of the above k should be as small as possible, in this case 6. In accordance with the above principle, the value of k is 4 and the value of n is 9 according to the formula n−k=5, which means the timing position for feeding back ACK/NACK corresponding to the downlink subframe with index 5 is the uplink subframe with index 9.

TABLE 1

| Configuration serial number | transition point cycle | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

TABLE 2

| Configuration serial number | Uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

To improve the transmission rate of UE, LTE-A is proposed on the basis of LTE. In LTE-A, wider bandwidth could be obtained by combining multiple Cell Carriers (CC). The combination of the multiple CC is called Carrier Aggregation (CA). For example, a 100 MHz bandwidth may be supported by combining 5 CC of 20 MHz, and each CC is called a cell. The base station could configure one UE to work in multiple cells. One of the cells is called Primary cell (Pcell), and the others are called Secondary cells (Scell).

In the TDD system of LTE-A, the multiple cells combined together should use the same uplink/downlink configurations. For example, every cell may use the configuration of number 1 in Table 1, so timing position of ACK/NACK configured for one cell using the same uplink/downlink configurations in LTE could be multiplexed totally, which is as shown in Table 2.

The TDD system of LTE-A employs cross-carrier scheduling and non cross-carrier scheduling, since multiple cells use exactly the same uplink/downlink configurations. In non-cross-carrier scheduling, the PDCCH of a downlink subframe in a cell schedules the PDSCH of this subframe. In cross-carrier scheduling, PDCCH of a downlink subframe in a Pcell schedules the PDSCH of the downlink subframe with the same timing position in a Scell. Accordingly, regardless of cross-carrier scheduling or non cross-carrier scheduling, when multiple cells use the same uplink/downlink configurations, the PDCCH and the scheduled PDSCH will be in downlink subframes with the same timing position.

Moreover, when frequency domain distances among multiple cells supporting CA are long enough, these cells may use different uplink/downlink configurations without interfering one another. Accordingly, in LTE-A, there is a need to determine how to transmit ACK/NACK when the uplink and downlink configurations of multiple cells are different in TDD systems supporting CA.

SUMMARY OF THE INVENTION

Aspects of the present invention are to address at least the above-mentioned problems and/or disadvantages and to provide at least the advantages described below. Accordingly, an aspect of the present invention provides a method and an apparatus for transmitting Acknowledgement/Non-Acknowledgement (ACK/NACK) signals in a wireless communication system.

Another aspect of the present invention is to provide a method and an apparatus for transmitting ACK/NACK signals in a TDD system supporting Carrier Aggregation (CA), when multiple cells of the CA use uplink and downlink configurations that are not all the same.

In accordance with an aspect of the present invention, a method for transmitting ACK/NACK signals by a User Equipment (UE) in a wireless communication system using CA is provided. The method includes receiving, from a base station, information on a Primary Cell (Pcell) and a Secondary Cell (Scell), determining a timing position for transmitting the ACK/NACK signals based on the received information; and transmitting, to the base station, the ACK/NACK signals in the determined timing position.

In accordance with another aspect of the present invention, A User Equipment (UE) for transmitting ACK/NACK signals in a wireless communication system using Carrier Aggregation (CA) is provided. The UE includes a receiver for receiving, from a base station, information on a Primary Cell (Pcell) and a Secondary Cell (Scell), a controller for determining a timing position for transmitting the ACK/NACK signals based on the received information, and a transmitter for transmitting, to the base station, the ACK/NACK signals in the determined timing position.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for transmitting ACK/NACK when uplink and downlink configurations of multiple cells are different. Exemplary embodiments of the present invention provide several configuration methods for a timing position of ACK/NACK, which will be described in detail in the following embodiments.

Figure 1:
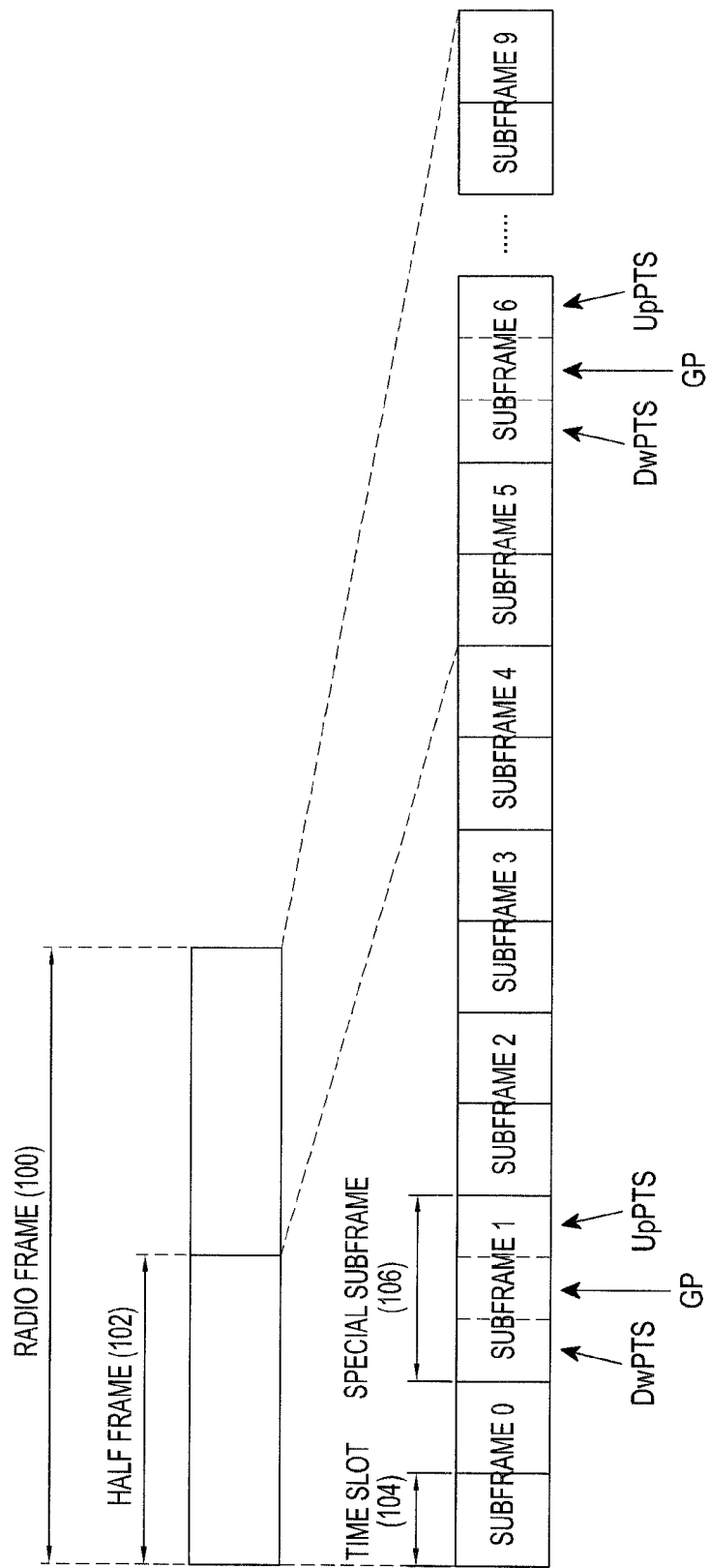
FIG. 1 is a diagram illustrating a frame structure configuration in a TD-LTE system according to the related art.
Figure 2:
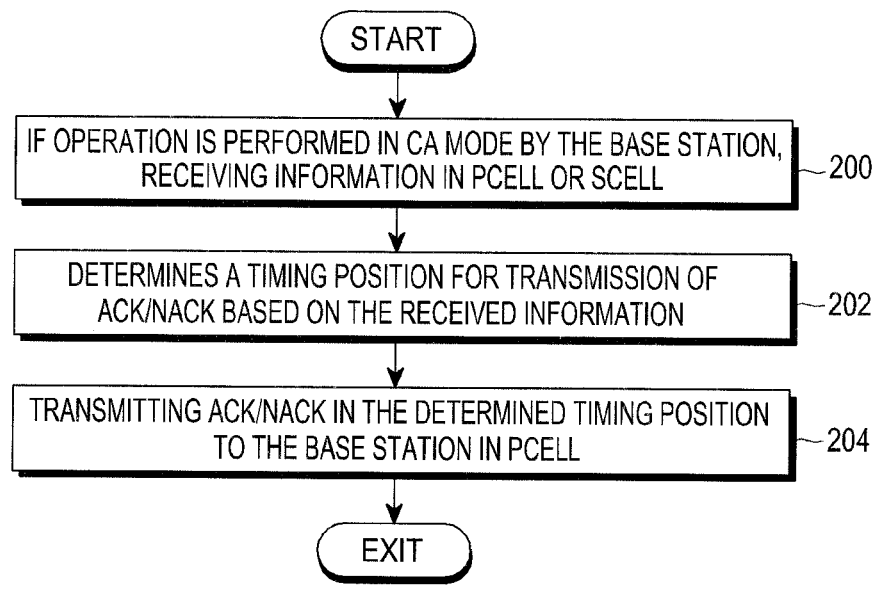
FIG. 2 is a flowchart illustrating the method for transmitting Acknowledgement/Non-Acknowledgement (ACK/NACK) by a User Equipment (UE) in a wireless communication system according to an exemplary embodiment of the present invention.

FIG. 2 is a flowchart illustrating the method for transmitting ACK/NACK by UE in a wireless communication system according to an exemplary embodiment of the present invention.

Referring to FIG. 2, in step 200, if the User Equipment (UE) operates in Carrier Aggregation (CA) mode by the base station, the UE receives information in Pcell or Scell. In step 202, the UE determines a timing position for transmission of ACK/NACK based on the received information. In step 204, the UE transmits ACK/NACK in the determined timing position to the base station in Pcell.

Figure 3:
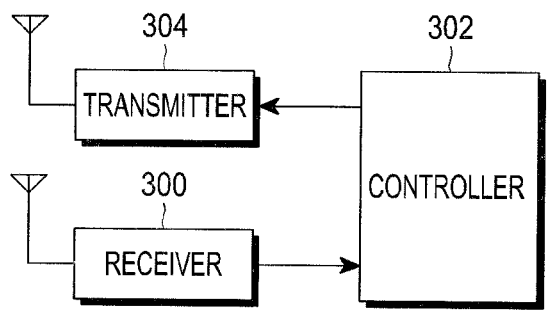
FIG. 3 is a block diagram illustrating a structure of UE according to an exemplary embodiment of the present invention.

FIG. 3 is a block diagram illustrating a structure of UE according to an exemplary embodiment of the present invention.

Referring to FIG. 3, the UE includes a receiver 300, a controller 302 and a transmitter 304. The UE may also include other units not shown here for purposes of clarity. These additional units may vary according to the function of the UE, and may include a display unit, input unit, camera, microphone, speakers, and the like.

The receiver 300 receives signals and data (i.e information in Pcell or Scell) from the base station. The information in Pcell or Scell includes information on Pcell or Scell.

The controller 302 controls the receiver 300 and the transmitter 304. The controller 402 controls all operations of the UE, and determines a timing position for ACK/NACK transmission based on information received by the receiver 300. The transmitter 304 transmits, to the BS, ACK/NACK in the determined timing position.

The UE may receive the PDCCH signal transmitted by the base station in Pcell or Scell, and receive PDSCH signal scheduled by PDCCH signal in Pcell or Scell. The UE may look up the ACK/NACK timing relations for the timing position for transmitting ACK/NACK in Pcell according to timing position of the downlink subframe in which PDSCH signal is transmitted. When multiple cells have different uplink and downlink configurations in CA mode, when non-cross carrier scheduling is used, the PDCCH signal in a downlink subframe schedules the PDSCH signal in the same subframe, and when cross carrier scheduling is used, the downlink subframe including the PDCCH signal of Pcell and the downlink subframe including the PDSCH signal of Scell may be transmitted at different timing positions.

Figure 4:
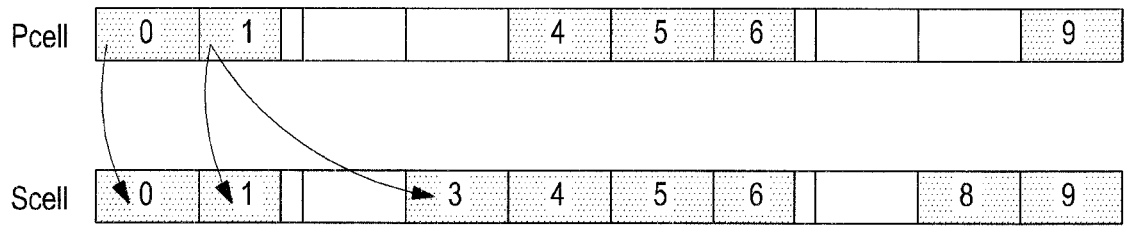
FIG. 4 is a diagram illustrating cross-carrier scheduling in according to an exemplary embodiment of the present invention.

FIG. 4 is a diagram illustrating cross-carrier scheduling in according to an exemplary embodiment of the present invention.

Referring to FIG. 4, the downlink subframe with index 1 in Pcell schedules the downlink subframe with index 3 in Scell. In FIG. 4, all the subframes with indexes are all downlink subframes, and the solid line arrow indicates a scheduling relationship.

According to an exemplary embodiment of the present invention, UE may also receive a PDCCH signal transmitted by the base station only in Pcell. The UE may look up the ACK/NACK timing relations for the timing position for transmitting ACK/NACK in Pcell according to timing position of the downlink subframe including PDCCH signal.

For the situation that UE may receive PDCCH signal transmitted by the base station in Pcell or Scell and receive PDSCH scheduled by PDCCH signal in Pcell or Scell, two exemplary embodiments for configuring ACK/NACK timing position in the exemplary embodiment of the present invention are described below.

First Exemplary Embodiment

According to the first exemplary embodiment of the present embodiment, when configuring the timing relation of ACK/NACK, in view of Pcell, the timing position for transmitting ACK/NACK is multiplexed in a cell with the same uplink and downlink configuration in LTE and LTE-A. In view of Scell, the configuration result of Pcell is multiplexed maximally.

In view of Pcell, assuming that the index of the downlink subframe in Pcell is n−k, the index of the uplink subframe in Pcell is n, then k is valued as shown in Table 2, which is the same as the situation of one cell in LTE and LTE-A.

In view of Scell, the downlink subframes in Scell are determined to have the same timing positions as downlink subframes in Pcell, timing positions for transmitting ACK/NACK corresponding to these downlink subframes are multiplexed with timing positions for transmitting ACK/NACK corresponding to downlink subframes of Pcell having the same timing positions. The downlink subframes in Scell having the same timing positions as uplink subframes in Pcell are determined, and timing positions for transmitting ACK/NACK corresponding to these downlink subframes are configured. For convenience of description, those downlink subframes of Scell having the same timing positions as that of uplink subframes of Pcell are called alone downlink subframes.

The first exemplary embodiment of the present embodiment is in view of the situation where uplink/downlink configurations of multiple cells in CA are different, multiplexing existing configuration result of ACK/NACK timing positions in LTE and LTE-A maximally, with good compatibility and easy implement.

In view of alone downlink subframes of Scell in the first exemplary embodiment of the present embodiment, corresponding timing positions are configured for transmitting ACK/NACK according to the following several principles:

① time duration between timing position of a downlink subframe and the timing position for transmitting ACK/NACK is greater than or equal to the smallest duration;

② timing positions for transmitting ACK/NACK of all downlink subframes of Scell is distributed to uplink subframes of Pcell evenly or as evenly as possible;

③ in view of all downlink subframes of Scell, the timing position for transmitting ACK/NACK corresponding to a downlink subframe with an earlier timing position is earlier than the timing position for transmitting ACK/NACK corresponding to a downlink subframe with a later timing position.

When Scell is being configured, with the above principle ① involved at least, a combination of any of the other principles may also be considered.

The first exemplary embodiment of the present invention may include the following two methods for configuring timing positions for transmitting ACK/NACK corresponding to alone downlink subframes of Scell in the present embodiment.

First, according to the 7 kinds of uplink/downlink configurations a TDD system supports, in view of each possible combination of uplink/downlink configurations of Pcell and Scell, timing positions for transmitting ACK/NACK corresponding to alone downlink subframes of Scell in each combination are configured. If the frame edge of the Pcell and the frame edge of the cell are unaligned, relative subframe offset should be further considered when determining the timing relations.

Figure 5:
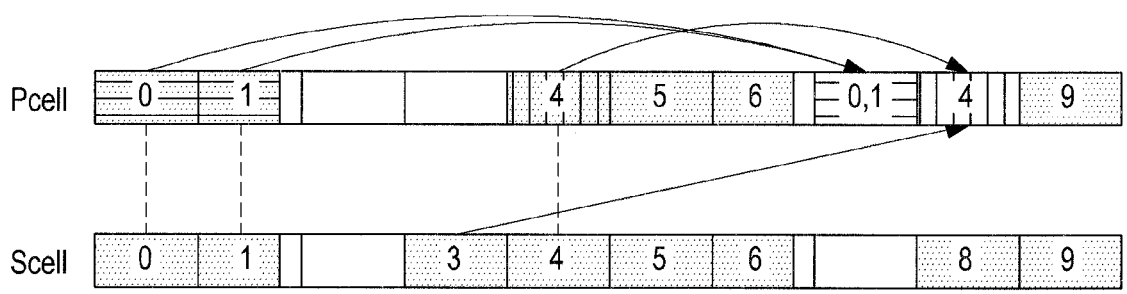
FIG. 5 is a diagram illustrating Pcell subframes and Scell subframes when cell frame edges are aligned according to a first exemplary embodiment of the present invention.

FIG. 5 is a diagram illustrating Pcell subframes and Scell subframes when cell frame edges are aligned according to a first exemplary embodiment of the present invention.

Referring to FIG. 5, a situation that frame edges of multiple cells are aligned is shown as an example. As shown in FIG. 5, it is also a downlink subframe in Pcell at corresponding timing position of the downlink subframe with index 0, 1 and 4 in Scell, so timing positions for transmitting ACK/NACK corresponding to these downlink subframes in Scell may multiplex the configuration result of Pcell directly, while it is an uplink subframe in Pcell at corresponding timing position of the downlink subframe with index 3 and 8 in Scell, so timing positions for transmitting ACK/NACK corresponding to these downlink subframes in Scell cannot multiplex the configuration result of Pcell directly, but should be redefined. The table below only provides timing positions for transmitting ACK/NACK corresponding to alone downlink subframes in Scell. Timing positions for transmitting ACK/NACK corresponding to all downlink subframes in Scell may be determined with reference to these tables and the ACK/NACK timing relations configured in LTE.

Considering the above principle ①, and assuming that index of an uplink subframe in Pcell is n and index of an alone downlink subframe is n−k, Table 3 shows values of k above in such case. Up to the requirement that duration of UE's processing data should be the smallest in LTE, the value of k should be greater than or equal to 4, and k should be as small as possible under such situations.

When the result of n−k is calculated to be negative, say n−k=−4, the radio frame cycle should be involved. If this cycle is 10 ms, it is calculated that −4+10=6, which represents the subframe with index 6 in the previous frame, and timing position of this subframe is one cycle earlier than that of the subframe corresponding to the index that is calculated directly.

As shown in Table 3, take the example that Pcell uses the sixth uplink/downlink configuration and Scell uses the fifth uplink/downlink configuration. In this case, the indexes of alone downlink subframes in Scell are 3, 4, 7, and 8, indexes of uplink subframes in Pcell are 2, 3, 4, 7, and 8, i.e., n−k equals 3, 4, 7, or 8. The value of n may be 2, 3, 4, 7 and 8. According to principle ①, considering that value of k should be as small as possible under the satisfied condition, when the value of k is 4, the timing position for transmitting ACK/NACK corresponding to the alone downlink subframe with index 8 in Scell is the uplink subframe with index 2 in Pcell, the timing position for transmitting ACK/NACK corresponding to the alone downlink subframe with index 3 in Scell is the uplink subframe with index 7 in Pcell, and the timing position for transmitting ACK/NACK corresponding to the alone downlink subframe with index 4 in Scell is the uplink subframe with index 8 in Pcell. When k is valued as 5, the timing position for transmitting ACK/NACK corresponding to the alone downlink subframe with index 7 in Scell is the uplink subframe with index 2 in Pcell.

TABLE 3

| Pcell Configuration serial number | Scell Configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| 0 | 0 | — | — | — | — | — | — | — | — | — | — |
| | 1 | — | — | — | 4 | — | — | — | — | 4 | — |
| | 2 | — | — | 4 | 4 | — | — | — | 4 | 4 | — |
| | 3 | — | — | 4, 5 | 4 | — | — | — | — | — | — |
| | 4 | — | — | 4, 5 | 4 | — | — | — | — | 4 | — |
| | 5 | — | — | 4, 5 | 4 | — | — | — | 4 | 4 | — |
| | 6 | — | — | — | 4 | — | — | — | — | — | — |
| 1 | 1 | — | — | — | — | — | — | — | — | — | — |
| | 0 | — | — | — | — | — | — | — | — | — | — |
| | 2 | — | — | 4 | — | — | — | — | 4 | — | — |
| | 3 | — | — | 4, 5 | — | — | — | — | — | — | — |
| | 4 | — | — | 4, 5 | — | — | — | — | — | — | — |
| | 5 | — | — | 4, 5 | — | — | — | — | 4 | — | — |

TABLE 3-continued

| Pcell Configuration serial number | Scell Configuration serial number | \multicolumn{10}{c}{Pcell uplink subframe index n} |||||||||||
|---|---|---|---|---|---|---|---|---|---|---|---|
| | | 0 | 1 | 2 | 3 | 4 | 5 | 6 | 7 | 8 | 9 |
| 2 | 6 | — | — | — | — | — | — | — | — | — | — |
| | 2 | — | — | — | — | — | — | — | — | — | — |
| | 0 | — | — | — | — | — | — | — | — | — | — |
| | 1 | — | — | — | — | — | — | — | — | — | — |
| | 3 | — | — | 5 | — | — | — | — | — | — | — |
| | 4 | — | — | 5 | — | — | — | — | — | — | — |
| | 5 | — | — | 5 | — | — | — | — | — | — | — |
| | 6 | — | — | — | — | — | — | — | — | — | — |
| 3 | 3 | — | — | — | — | — | — | — | — | — | — |
| | 0 | — | — | — | — | — | — | — | — | — | — |
| | 1 | — | — | 8 | — | — | — | — | — | — | — |
| | 2 | — | — | 9, 8 | — | — | — | — | — | — | — |
| | 4 | — | — | 8 | — | — | — | — | — | — | — |
| | 5 | — | — | 9, 8 | — | — | — | — | — | — | — |
| | 6 | — | — | — | — | — | — | — | — | — | — |
| 4 | 4 | — | — | — | — | — | — | — | — | — | — |
| | 0 | — | — | — | — | — | — | — | — | — | — |
| | 1 | — | — | — | — | — | — | — | — | — | — |
| | 2 | — | — | 9 | — | — | — | — | — | — | — |
| | 3 | — | — | — | — | — | — | — | — | — | — |
| | 5 | — | — | 9 | — | — | — | — | — | — | — |
| | 6 | — | — | — | — | — | — | — | — | — | — |
| 5 | 5 | — | — | — | — | — | — | — | — | — | — |
| | 0 | — | — | — | — | — | — | — | — | — | — |
| | 1 | — | — | — | — | — | — | — | — | — | — |
| | 2 | — | — | — | — | — | — | — | — | — | — |
| | 3 | — | — | — | — | — | — | — | — | — | — |
| | 4 | — | — | — | — | — | — | — | — | — | — |
| | 6 | — | — | — | — | — | — | — | — | — | — |
| 6 | 6 | — | — | — | — | — | — | — | — | — | — |
| | 0 | — | — | — | — | — | — | — | — | — | — |
| | 1 | — | — | — | — | — | — | — | — | — | 4 | — |
| | 2 | — | — | 4 | — | — | — | — | 4 | 4 | — |
| | 3 | — | — | 5, 4 | — | — | — | — | — | — | — |
| | 4 | — | — | 5, 4 | — | — | — | — | — | 4 | — |
| | 5 | — | — | 5, 4 | — | — | — | — | 4 | 4 | — |

Considering the above principle ① and ③, and assuming that the index of an uplink subframe in Pcell is n and the index of an alone downlink subframe in Scell is n−k, Table 4 shows values of k in such conditions. Similarly, the value of k should be as small as possible under the satisfied conditions.

As shown in Table 4 below, take the example that Pcell uses the sixth uplink/downlink configuration and Scell uses the fifth uplink/downlink configuration. In this example, indexes of alone downlink subframes in Scell are 3, 4, 7, and 8, indexes of uplink subframes in Pcell are 2, 3, 4, 7, and 8, i.e., n−k equals 3, 4, 7, or 8. The value of n may be 2, 3, 4, 7, and 8. According to the above principle ① and ③, considering that value of k should be as small as possible under the satisfied condition, when the value of k is 6, the timing position for transmitting ACK/NACK corresponding to the alone downlink subframe with index 7 in Scell is the uplink subframe with index 3 in Pcell. When the value of k is 5, the timing position for transmitting ACK/NACK corresponding to the alone downlink subframe with index 8 in Scell is the uplink subframe with index 3 in Pcell, and the timing position for transmitting ACK/NACK corresponding to the alone downlink subframe with index 3 in Scell is the uplink subframe with index 8 in Pcell. When the value of k is 4, the timing position for transmitting ACK/NACK corresponding to the alone downlink subframe with index 4 in Scell is the uplink subframe with index 8 in Pcell.

TABLE 4

| Pcell configuration serial number | Scell configuration serial number | \multicolumn{10}{c}{Pcell uplink subframe index n} |||||||||||
|---|---|---|---|---|---|---|---|---|---|---|---|
| | | 0 | 1 | 2 | 3 | 4 | 5 | 6 | 7 | 8 | 9 |
| 0 | 0 | — | — | — | — | — | — | — | — | — | — |
| | 1 | — | — | — | — | 4 | — | — | — | 4 | — |
| | 2 | — | — | 4 | 4 | — | — | — | 4 | 4 | — |
| | 3 | — | — | 4, 5 | 4 | — | — | — | — | — | — |
| | 4 | — | — | 4, 5 | 4 | — | — | — | — | 4 | — |
| | 5 | — | — | 4, 5 | 4 | — | — | — | 4 | 4 | — |
| | 6 | — | — | — | 4 | — | — | — | — | — | — |
| 1 | 1 | — | — | — | — | — | — | — | — | — | — |
| | 0 | — | — | — | — | — | — | — | — | — | — |
| | 2 | — | — | 4 | — | — | — | — | 4 | — | — |
| | 3 | — | — | 4, 5 | — | — | — | — | — | — | — |

TABLE 4-continued

| Pcell configuration serial number | Scell configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| | 4 | — | — | 4, 5 | — | — | — | — | — | — | — |
| | 5 | — | — | 4, 5 | — | — | — | — | 4 | — | — |
| | 6 | — | — | — | — | — | — | — | — | — | — |
| 2 | 2 | — | — | — | — | — | — | — | — | — | — |
| | 0 | — | — | — | — | — | — | — | — | — | — |
| | 1 | — | — | — | — | — | — | — | — | — | — |
| | 3 | — | — | 5 | — | — | — | — | — | — | — |
| | 4 | — | — | 5 | — | — | — | — | — | — | — |
| | 5 | — | — | 5 | — | — | — | — | — | — | — |
| | 6 | — | — | — | — | — | — | — | — | — | — |
| 3 | 3 | — | — | — | — | — | — | — | — | — | — |
| | 0 | — | — | — | — | — | — | — | — | — | — |
| | 1 | — | — | 8 | — | — | — | — | — | — | — |
| | 2 | — | — | 9, 8 | — | — | — | — | — | — | — |
| | 4 | — | — | 8 | — | — | — | — | — | — | — |
| | 5 | — | — | 9, 8 | — | — | — | — | — | — | — |
| | 6 | — | — | — | — | — | — | — | — | — | — |
| 4 | 4 | — | — | — | — | — | — | — | — | — | — |
| | 0 | — | — | — | — | — | — | — | — | — | — |
| | 1 | — | — | — | — | — | — | — | — | — | — |
| | 2 | — | — | 9 | — | — | — | — | — | — | — |
| | 3 | — | — | — | — | — | — | — | — | — | — |
| | 5 | — | — | 9 | — | — | — | — | — | — | — |
| | 6 | — | — | — | — | — | — | — | — | — | — |
| 5 | 5 | — | — | — | — | — | — | — | — | — | — |
| | 0 | — | — | — | — | — | — | — | — | — | — |
| | 1 | — | — | — | — | — | — | — | — | — | — |
| | 2 | — | — | — | — | — | — | — | — | — | — |
| | 3 | — | — | — | — | — | — | — | — | — | — |
| | 4 | — | — | — | — | — | — | — | — | — | — |
| | 6 | — | — | — | — | — | — | — | — | — | — |
| 6 | 6 | — | — | — | — | — | — | — | — | — | — |
| | 0 | — | — | — | — | — | — | — | — | — | — |
| | 1 | — | — | — | — | — | — | — | — | 4 | — |
| | 2 | — | — | — | 5 | — | — | — | — | 5, 4 | — |
| | 3 | — | — | — | 6, 5 | — | — | — | — | — | — |
| | 4 | — | — | — | 6, 5 | — | — | — | — | 4 | — |
| | 5 | — | — | — | 6, 5 | — | — | — | — | 5, 4 | — |

Considering the above principle ②and ①, in view of all downlink subframes in Scell, it is guaranteed first that timing positions for transmitting ACK/NACK corresponding to all downlink subframes are evenly distributed among uplink subframes in Pcell to the most extent, and then it is configured that the duration between timing position of each alone downlink subframe in Scell and corresponding timing position for transmitting ACK/NACK is greater than or equal to the minimum duration of UE's processing data. Assuming that index of an uplink subframe in Pcell is n and index of an alone downlink subframe in Scell is n−k, Table 5 shows values of k in such conditions. Similarly, the value of k should be as small as possible under the satisfied conditions.

As shown in Table 5 below, take the example that Pcell uses the sixth uplink/downlink configuration and Scell uses the fifth uplink/downlink configuration. In this example, indexes of alone downlink subframes in Scell are 3, 4, 7 and 8, and indexes of uplink subframes in Pcell are 2, 3, 4, 7 and 8, i.e., n−k equals 3, 4, 7 or 8. The value of n may be 2, 3, 4, 7 and 8. According to the above principle ②, considering that value of k should be as small as possible under the satisfied condition, it should be guaranteed that timing positions for transmitting ACK/NACK corresponding to all downlink subframes are evenly distributed among uplink subframes in Pcell to the most extent, i.e., evenly distributed among uplink subframes with index 2, 3, 4, 7 and 8 in Pcell. According to the above principle ①, it is determined that when value of k is 5, the timing position for transmitting ACK/NACK corresponding to the alone downlink subframe with index 7 in Scell is the uplink subframe with index 2 in Pcell, and the timing position for transmitting ACK/NACK corresponding to the alone downlink subframe with index 8 in Scell is the uplink subframe with index 3 in Pcell. When the value of k is 4, the timing position for transmitting ACK/NACK corresponding to the alone downlink subframe with index 3 in Scell is the uplink subframe with index 7 in Pcell, and the timing position for transmitting ACK/NACK corresponding to the alone downlink subframe with index 4 in Scell is the uplink subframe with index 8 in Pcell.

TABLE 5

| Pcell configuration serial number | Scell configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| 0 | 0 | — | — | — | — | — | — | — | — | — | — |
| | 1 | — | — | — | 4 | — | — | — | — | 4 | — |
| | 2 | — | — | 4 | 4 | — | — | — | 4 | 4 | — |

TABLE 5-continued

| Pcell configuration serial number | Scell configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| | 3 | — | — | 5 | 5, 4 | — | — | — | — | — | — |
| | 4 | — | — | 5 | 5, 4 | — | — | — | — | 4 | — |
| | 5 | — | — | 5 | 5, 4 | — | — | — | 4 | 4 | — |
| | 6 | — | — | — | 4 | — | — | — | — | — | — |
| 1 | 0 | — | — | — | — | — | — | — | — | — | — |
| | 1 | — | — | — | — | — | — | — | — | — | — |
| | 2 | — | — | — | 5 | — | — | — | — | 5 | — |
| | 3 | — | — | 5 | 5 | — | — | — | — | — | — |
| | 4 | — | — | 5 | 5 | — | — | — | — | — | — |
| | 5 | — | — | 5 | 5 | — | — | — | — | 5 | — |
| | 6 | — | — | — | — | — | — | — | — | — | — |
| 2 | 0 | — | — | — | — | — | — | — | — | — | — |
| | 1 | — | — | — | — | — | — | — | — | — | — |
| | 2 | — | — | — | — | — | — | — | — | — | — |
| | 3 | — | — | 5 | — | — | — | — | — | — | — |
| | 4 | — | — | 5 | — | — | — | — | — | — | — |
| | 5 | — | — | 5 | — | — | — | — | — | — | — |
| | 6 | — | — | — | — | — | — | — | — | — | — |
| 3 | 0 | — | — | — | — | — | — | — | — | — | — |
| | 1 | — | — | — | 9 | — | — | — | — | — | — |
| | 2 | — | — | — | 10, 9 | — | — | — | — | — | — |
| | 3 | — | — | — | — | — | — | — | — | — | — |
| | 4 | — | — | — | 9 | — | — | — | — | — | — |
| | 5 | — | — | — | 10 | 10 | — | — | — | — | — |
| | 6 | — | — | — | — | — | — | — | — | — | — |
| 4 | 0 | — | — | — | — | — | — | — | — | — | — |
| | 1 | — | — | — | — | — | — | — | — | — | — |
| | 2 | — | — | — | 10 | — | — | — | — | — | — |
| | 3 | — | — | — | — | — | — | — | — | — | — |
| | 4 | — | — | — | — | — | — | — | — | — | — |
| | 5 | — | — | 9 | — | — | — | — | — | — | — |
| | 6 | — | — | — | — | — | — | — | — | — | — |
| 5 | 0 | — | — | — | — | — | — | — | — | — | — |
| | 1 | — | — | — | — | — | — | — | — | — | — |
| | 2 | — | — | — | — | — | — | — | — | — | — |
| | 3 | — | — | — | — | — | — | — | — | — | — |
| | 4 | — | — | — | — | — | — | — | — | — | — |
| | 5 | — | — | — | — | — | — | — | — | — | — |
| | 6 | — | — | — | — | — | — | — | — | — | — |
| 6 | 0 | — | — | — | — | — | — | — | — | — | — |
| | 1 | — | — | — | — | — | — | — | — | 4 | — |
| | 2 | — | — | 4 | — | — | — | — | 4 | 4 | — |
| | 3 | — | — | 5 | 5 | — | — | — | — | — | — |
| | 4 | — | — | 5 | 5 | — | — | — | — | 4 | — |
| | 5 | — | — | 5 | 5 | — | — | — | 4 | 4 | — |
| | 6 | — | — | — | — | — | — | — | — | — | — |

Considering all three configuration principles at the same time, the first way may be that timing positions for transmitting ACK/NACK corresponding to all downlink subframes in Scell are evenly distributed among uplink subframes in Pcell to the most extent. Under the condition of satisfying principle ②, it is guaranteed as much as possible that in view of all downlink subframes of Scell, the sequence of corresponding timing positions for transmitting ACK/NACK is determined according to the sequence of the timing positions of all downlink subframes, and the duration between timing position of each alone downlink subframe in Scell and the corresponding timing position for transmitting ACK/NACK is greater than or equal to the minimum duration of UE's processing data. Assuming that index of an uplink subframe in Pcell is n and index of an alone downlink subframe in Scell is n−k, Table 6 shows values of k in such conditions. Similarly, value of k should be as small as possible under the satisfied conditions.

As shown in Table 6 below, take the example that Pcell uses the sixth uplink/downlink configuration and Scell uses the fifth uplink/downlink configuration. In this example, indexes of alone downlink subframes in Scell are 3, 4, 7 and 8, and indexes of uplink subframes in Pcell are 2, 3, 4, 7 and 8, i.e., n−k equals 3, 4, 7 or 8. The value of n may be 2, 3, 4, 7 and 8. According to the above principle ② at first, considering all downlink subframes in Scell, it should be guaranteed that timing positions for transmitting ACK/NACK corresponding to all downlink subframes are evenly distributed among uplink subframes in Pcell to the most extent, i.e., evenly distributed among uplink subframes with index 2, 3, 4, 7 and 8 in Pcell. According to the above principle ① and ③, it is determined that when value of k is 8, the timing position for transmitting ACK/NACK corresponding to the alone downlink subframe with index 4 in Scell is the uplink subframe with index 2 in Pcell. When the value of k is 6, the timing position for transmitting ACK/NACK corresponding to the alone downlink subframe with index 7 in Scell is the uplink subframe with index 3 in Pcell, and the timing position for transmitting ACK/NACK corresponding to the alone downlink subframe with index 8 in Scell is the uplink subframe with index 4 in Pcell. When the value of k is 5, the timing position for transmitting ACK/NACK corresponding to the alone downlink subframe with index 3 in Scell is the uplink subframe with index 8 in Pcell.

TABLE 6

| Pcell configuration serial number | Scell configuration serial number | 0 | 1 | 2 | 3 | 4 | 5 | 6 | 7 | 8 | 9 |
|---|---|---|---|---|---|---|---|---|---|---|---|
| 0 | 0 | — | — | — | — | — | — | — | — | — | — |
|   | 1 | — | — | — | 4 | — | — | — | — | 4 | — |
|   | 2 | — | — | 4 | 4 | — | — | — | 4 | 4 | — |
|   | 3 | — | — | 5 | 5, 4 | — | — | — | — | — | — |
|   | 4 | — | — | 5 | 5, 4 | — | — | — | — | 4 | — |
|   | 5 | — | — | 5 | 5, 4 | — | — | — | 4 | 4 | — |
|   | 6 | — | — | — | 4 | — | — | — | — | — | — |
| 1 | 1 | — | — | — | — | — | — | — | — | — | — |
|   | 0 | — | — | — | — | — | — | — | — | — | — |
|   | 2 | — | — | — | 5 | — | — | — | — | 5 | — |
|   | 3 | — | — | 5 | 5 | — | — | — | — | — | — |
|   | 4 | — | — | 5 | 5 | — | — | — | — | — | — |
|   | 5 | — | — | 5 | 5 | — | — | — | — | 5 | — |
|   | 6 | — | — | — | — | — | — | — | — | — | — |
| 2 | 2 | — | — | — | — | — | — | — | — | — | — |
|   | 0 | — | — | — | — | — | — | — | — | — | — |
|   | 1 | — | — | — | — | — | — | — | — | — | — |
|   | 3 | — | — | 5 | — | — | — | — | — | — | — |
|   | 4 | — | — | 5 | — | — | — | — | — | — | — |
|   | 5 | — | — | 5 | — | — | — | — | — | — | — |
|   | 6 | — | — | — | — | — | — | — | — | — | — |
| 3 | 3 | — | — | — | — | — | — | — | — | — | — |
|   | 0 | — | — | — | — | — | — | — | — | — | — |
|   | 1 | — | — | — | 9 | — | — | — | — | — | — |
|   | 2 | — | — | — | 10, 9 | — | — | — | — | — | — |
|   | 4 | — | — | — | 9 | — | — | — | — | — | — |
|   | 5 | — | — | — | 10 | 10 | — | — | — | — | — |
|   | 6 | — | — | — | — | — | — | — | — | — | — |
| 4 | 4 | — | — | — | — | — | — | — | — | — | — |
|   | 0 | — | — | — | — | — | — | — | — | — | — |
|   | 1 | — | — | — | — | — | — | — | — | — | — |
|   | 2 | — | — | — | 10 | — | — | — | — | — | — |
|   | 3 | — | — | — | — | — | — | — | — | — | — |
|   | 5 | — | — | 9 | — | — | — | — | — | — | — |
|   | 6 | — | — | — | — | — | — | — | — | — | — |
| 5 | 5 | — | — | — | — | — | — | — | — | — | — |
|   | 0 | — | — | — | — | — | — | — | — | — | — |
|   | 1 | — | — | — | — | — | — | — | — | — | — |
|   | 2 | — | — | — | — | — | — | — | — | — | — |
|   | 3 | — | — | — | — | — | — | — | — | — | — |
|   | 4 | — | — | — | — | — | — | — | — | — | — |
|   | 6 | — | — | — | — | — | — | — | — | — | — |
| 6 | 6 | — | — | — | — | — | — | — | — | — | — |
|   | 0 | — | — | — | — | — | — | — | — | — | — |
|   | 1 | — | — | — | — | — | — | — | — | 4 | — |
|   | 2 | — | — | 8 | 5 | — | — | — | — | 5 | — |
|   | 3 | — | — | — | 6 | 6 | — | — | — | — | — |
|   | 4 | — | — | — | 6 | 6 | — | — | — | 4 | — |
|   | 5 | — | — | 8 | 6 | 6 | — | — | — | 5 | — |

Considering the three configuration principles at the same time, the second way may be that in view of all downlink subframes of Scell, the sequence of corresponding timing positions for transmitting ACK/NACK is determined according to sequence of the timing positions of all downlink subframes. Under the condition of satisfying principle ③, it is guaranteed as much as possible that timing positions for transmitting ACK/NACK corresponding to all downlink subframes in Scell are evenly distributed among uplink subframes in Pcell to the most extent, and the duration between timing position of each alone downlink subframe in Scell and corresponding timing position for transmitting ACK/NACK is greater than or equal to the minimum duration of UE's processing data. Assuming that index of an uplink subframe in Pcell is n and index of an alone downlink subframe in Scell is n−k, Table 7 shows values of k in such conditions. Similarly, the value of k should be as small as possible under the satisfied conditions.

TABLE 7

| Pcell configuration serial number | Scell configuration serial number | 0 | 1 | 2 | 3 | 4 | 5 | 6 | 7 | 8 | 9 |
|---|---|---|---|---|---|---|---|---|---|---|---|
| 0 | 0 | — | — | — | — | — | — | — | — | — | — |
|   | 1 | — | — | — | 4 | — | — | — | — | 4 | — |
|   | 2 | — | — | 4 | 4 | — | — | — | 4 | 4 | — |
|   | 3 | — | — | 5 | 5, 4 | — | — | — | — | — | — |

TABLE 7-continued

| Pcell configuration serial number | Scell configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| | 4 | — | — | 5 | 5, 4 | — | — | — | — | 4 | — |
| | 5 | — | — | 5 | 5, 4 | — | — | — | 4 | 4 | — |
| | 6 | — | — | — | 4 | — | — | — | — | — | — |
| 1 | 1 | — | — | — | — | — | — | — | — | — | — |
| | 0 | — | — | — | — | — | — | — | — | — | — |
| | 2 | — | — | — | 5 | — | — | — | — | 5 | — |
| | 3 | — | — | 5 | 5 | — | — | — | — | — | — |
| | 4 | — | — | 5 | 5 | — | — | — | — | — | — |
| | 5 | — | — | 5 | 5 | — | — | — | — | 5 | — |
| | 6 | — | — | — | — | — | — | — | — | — | — |
| 2 | 2 | — | — | — | — | — | — | — | — | — | — |
| | 0 | — | — | — | — | — | — | — | — | — | — |
| | 1 | — | — | — | — | — | — | — | — | — | — |
| | 3 | — | — | 5 | — | — | — | — | — | — | — |
| | 4 | — | — | 5 | — | — | — | — | — | — | — |
| | 5 | — | — | 5 | — | — | — | — | — | — | — |
| | 6 | — | — | — | — | — | — | — | — | — | — |
| 3 | 3 | — | — | — | — | — | — | — | — | — | — |
| | 0 | — | — | — | — | — | — | — | — | — | — |
| | 1 | — | — | 8 | — | — | — | — | — | — | — |
| | 2 | — | — | 8, 9 | — | — | — | — | — | — | — |
| | 4 | — | — | 8 | — | — | — | — | — | — | — |
| | 5 | — | — | 8, 9 | — | — | — | — | — | — | — |
| | 6 | — | — | — | — | — | — | — | — | — | — |
| 4 | 4 | — | — | — | — | — | — | — | — | — | — |
| | 0 | — | — | — | — | — | — | — | — | — | — |
| | 1 | — | — | — | — | — | — | — | — | — | — |
| | 2 | — | — | 9 | — | — | — | — | — | — | — |
| | 3 | — | — | — | — | — | — | — | — | — | — |
| | 5 | — | — | 9 | — | — | — | — | — | — | — |
| | 6 | — | — | — | — | — | — | — | — | — | — |
| 5 | 5 | — | — | — | — | — | — | — | — | — | — |
| | 0 | — | — | — | — | — | — | — | — | — | — |
| | 1 | — | — | — | — | — | — | — | — | — | — |
| | 2 | — | — | — | — | — | — | — | — | — | — |
| | 3 | — | — | — | — | — | — | — | — | — | — |
| | 4 | — | — | — | — | — | — | — | — | — | — |
| | 6 | — | — | — | — | — | — | — | — | — | — |
| 6 | 6 | — | — | — | — | — | — | — | — | — | — |
| | 0 | — | — | — | — | — | — | — | — | — | — |
| | 1 | — | — | — | — | — | — | — | — | 4 | — |
| | 2 | — | — | 8 | 5 | — | — | — | — | 5 | — |
| | 3 | — | — | — | 6 | 6 | — | — | — | — | — |
| | 4 | — | — | — | 6 | 6 | — | — | — | 4 | — |
| | 5 | — | — | 8 | 6 | 6 | — | — | — | 5 | — |

Second, in view of the 7 kinds of uplink/downlink configurations a TDD system supports, considering each kind of uplink/downlink configuration applied in Pcell no matter which uplink/downlink configuration is used by Scell, a common ACK/NACK timing position is configured corresponding to an alone downlink subframe of Scell. Because there are seven kinds of TDD uplink/downlink configurations in LTE/LTE-A, this method only requires to configure seven kinds of timing relations for transmitting ACK/NACK in view of Scell correspondingly.

The situation when frame edges of multiple cells are aligned is considered first.

Assuming that there are D downlink subframes and U uplink subframes under one kind of uplink/downlink configuration, while practically, on the premise that frame edges of multiple cells are aligned, among the seven uplink/downlink configurations a TDD system supports, the subframe with index 2 must be an uplink subframe. Accordingly, no matter which uplink/downlink configuration is used, the alone downlink subframe in Scell will not be at the timing position of the subframe with index 2.

As to downlink subframes in Scell with the same timing positions as the D downlink subframes in Pcell, corresponding timing positions for transmitting ACK/NACK are the same as downlink subframes in Pcell with the same timing positions. In this method, the subframes in Scell at timing positions of the U-1 uplink subframes in Pcell except the subframe with index 2 are taken as common subframes, and the corresponding timing positions are respectively configured for transmitting ACK/NACK. This method equals to the assumption that Scell uses the fifth uplink/downlink configuration to configure common ACK/NACK timing relations, and the common ACK/NACK timing relations are applied to other uplink/downlink configurations. When Scell uses different uplink/downlink configurations, at the timing positions of the U-1 uplink subframes in Pcell, only part of the subframes thereof are downlink subframes maybe. In view of this part of downlink subframes, corresponding ACK/NACK timing positions should be determined according to the common configurations.

As in the first implementation, the configuration may be executed by selecting several combinations of the principles on the basis of satisfying principle ①.

Corresponding to Table 3 as above, i.e., when only principle ① is considered, assuming that index of an uplink subframe in Pcell is n, n−k denotes index of a common subframe. Table 8 shows values of k in such condition. Similarly, the value of k should be as small as possible under the satisfied condition.

Take the example that Pcell uses the sixth uplink/downlink configuration. In this example, indexes of uplink subframes in Pcell are 2, 3, 4, 7 and 8, so subframes in Scell at the timing position of uplink subframes with index 3, 4, 7 and 8 in Pcell are taken as common subframes, and corresponding timing positions for transmitting ACK/NACK have to be configured. It is assumed that value of k is greater than or equal to 4, which meets the requirement of minimum duration of UE's processing data in LTE. When the value of k is 5, the timing position for transmitting ACK/NACK corresponding to the alone downlink subframe with index 7 in Scell is the uplink subframe with index 2 in Pcell. When the value of k is 4, the timing position for transmitting ACK/NACK corresponding to the alone downlink subframe with index 8 in Scell is the uplink subframe with index 2 in Pcell, the timing position for transmitting ACK/NACK corresponding to the alone downlink subframe with index 3 in Scell is the uplink subframe with index 7 in Pcell, and the timing position for transmitting ACK/NACK corresponding to the alone downlink subframe with index 4 in Scell is the uplink subframe with index 8 in Pcell. Assuming that Scell uses the fifth uplink/downlink configuration, according to timing position for transmitting ACK/NACK configured for the common subframe above, the timing position for transmitting ACK/NACK corresponding to the subframe with index 3 is the same as that for transmitting ACK/NACK corresponding to the common subframe with index 3, i.e., the uplink subframe with index 7 in Pcell.

TABLE 8

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4, 5 | 4 | — | — | — | 4 | 4 | — |
| 1 | — | — | 4, 5 | — | — | — | — | 4 | — | — |
| 2 | — | — | 5 | — | — | — | — | — | — | — |
| 3 | — | — | 9, 8 | — | — | — | — | — | — | — |
| 4 | — | — | 9 | — | — | — | — | — | — | — |
| 5 | — | — | — | — | — | — | — | — | — | — |
| 6 | — | — | 5, 4 | — | — | — | — | 4 | 4 | — |

Corresponding to Table 4 as above, i.e., when principle ③ and principle ① are considered, assuming that index of an uplink subframe in Pcell is n, n−k denotes the index of a common subframe. Table 9 shows values of k in such conditions. Similarly, the value of k should be as small as possible under the satisfied conditions.

Take the example that Pcell uses the sixth uplink/downlink configuration shown in Table 9 below. In this example, indexes of uplink subframes in Pcell are 2, 3, 4, 7 and 8, so subframes in Scell at the timing position of uplink subframes with index 3, 4, 7 and 8 in Pcell are taken as common subframes, and corresponding timing positions for transmitting ACK/NACK should be configured. It is assumed that value of k is greater than or equal to 4, which meets the requirement of minimum duration of UE's processing data in LTE. When the value of k is 6, the timing position for transmitting ACK/NACK corresponding to the alone downlink subframe with index 7 in Scell is the uplink subframe with index 3 in Pcell. When the value of k is 5, the timing position for transmitting ACK/NACK corresponding to the alone downlink subframe with index 8 in Scell is the uplink subframe with index 3 in Pcell, and the timing position for transmitting ACK/NACK corresponding to the alone downlink subframe with index 3 in Scell is the uplink subframe with index 8 in Pcell. When the value of k is 4, the timing position for transmitting ACK/NACK corresponding to the alone downlink subframe with index 4 in Scell is the uplink subframe with index 8 in Pcell. Assuming that Scell uses the fifth uplink/downlink configuration, according to timing position for transmitting ACK/NACK configured for the common subframe above, the timing position for transmitting ACK/NACK corresponding to the subframe with index 3 is the same as that for transmitting ACK/NACK corresponding to the common subframe with index 3, i.e., the uplink subframe with index 8 in Pcell.

TABLE 9

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4, 5 | 4 | — | — | — | 4 | 4 | — |
| 1 | — | — | 4, 5 | — | — | — | — | 4 | — | — |
| 2 | — | — | 5 | — | — | — | — | — | — | — |
| 3 | — | — | 9, 8 | — | — | — | — | — | — | — |
| 4 | — | — | 9 | — | — | — | — | — | — | — |
| 5 | — | — | — | — | — | — | — | — | — | — |
| 6 | — | — | — | 6, 5 | — | — | — | — | 5, 4 | — |

Corresponding to Table 5 as above, i.e., when principle ② and principle ① are considered, in view of all downlink subframes in Scell, it is guaranteed first that timing positions for transmitting ACK/NACK corresponding to all downlink subframes are evenly distributed among uplink subframes in Pcell to the most extent, and then it is configured that the duration between timing position of the common subframe and corresponding timing position for transmitting ACK/NACK is greater than or equal to the minimum duration of UE's processing data. Similarly, the value of k should be as small as possible under the satisfied conditions.

Assuming that index of an uplink subframe in Pcell is n, n−k denotes index of a common subframe. Table 10 shows values of k in such condition.

Take the example that Pcell uses the sixth uplink/downlink configuration shown in Table 10 below. In this example, indexes of uplink subframes in Pcell are 2, 3, 4, 7 and 8, so subframes in Scell at the timing position of uplink subframes with index 3, 4, 7 and 8 in Pcell are taken as common subframes, and corresponding timing positions for transmitting ACK/NACK have to be configured. It is assumed that value of k is greater than or equal to 4, which meets the requirement of minimum duration of UE's processing data in LTE. When the value of k is 5, the timing position for transmitting ACK/NACK corresponding to the alone downlink subframe with index 7 in Scell is the uplink subframe with index 2 in Pcell, and the timing position for transmitting ACK/NACK corresponding to the alone downlink subframe with index 8 in Scell is the uplink subframe with index 3 in Pcell. When the value of k is 4, the timing position for transmitting ACK/NACK corresponding to the alone downlink subframe with index 3 in Scell is the uplink subframe with index 7 in Pcell, and the timing position for transmitting ACK/NACK corresponding to the alone downlink subframe with index 4 in Scell is the uplink subframe with index 8 in Pcell. Assuming that Scell uses the fifth uplink/downlink configuration, according to timing position for transmitting ACK/NACK configured for the common subframe above, the timing position for transmitting ACK/NACK corresponding to the subframe with index 3 is the same as that for transmitting ACK/NACK corresponding to the common subframe with index 3, i.e., the uplink subframe with index 7 in Pcell.

TABLE 10

| Pcell configuration | Pcell uplink subframe index n | | | | | | | | | |
|---|---|---|---|---|---|---|---|---|---|---|
| serial number | 0 | 1 | 2 | 3 | 4 | 5 | 6 | 7 | 8 | 9 |
| 0 | — | — | 5 | 5, 4 | — | — | — | — | 4 | 4 | — |
| 1 | — | — | 5 | 5 | — | — | — | — | 5 | — |
| 2 | — | — | 5 | — | — | — | — | — | — | — |
| 3 | — | — | — | 10 | 10 | — | — | — | — | — |
| 4 | — | — | 9 | — | — | — | — | — | — | — |
| 5 | — | — | — | — | — | — | — | — | — | — |
| 6 | — | — | 5 | 5 | — | — | — | — | 4 | 4 | — |

Corresponding to Table 6 as above, i.e., when all the three principles are considered, the first way may guarantee first that timing positions for transmitting ACK/NACK corresponding to all downlink subframes are evenly distributed among uplink subframes in Pcell to the most extent. On the basis of guaranteeing principle ②, it is guaranteed as much as possible that for timing positions of all the downlink subframes of Pcell and common subframes, the sequence of corresponding timing position for transmitting ACK/NACK is determined according to sequence of these timing positions, and it is guaranteed that the duration between timing position of the common subframe and corresponding timing position for transmitting ACK/NACK is greater than or equal to the minimum duration of UE's processing data. Similarly, the value of k should be as small as possible under the satisfied condition the.

Assuming that index of an uplink subframe in Pcell is n, n−k denotes index of a common subframe. Table 11 shows values of k in such condition.

Take the example that Pcell uses the sixth uplink/downlink configuration shown in Table 11 below. In this example, indexes of uplink subframes in Pcell are 2, 3, 4, 7 and 8, so subframes in Scell at the timing position of uplink subframes with index 3, 4, 7 and 8 in Pcell are taken as common subframes, and corresponding timing positions for transmitting ACK/NACK have to be configured. It is assumed that the value of k is greater than or equal to 4, which meets the requirement of minimum duration of UE's processing data in LTE. When the value of k is 8, the timing position for transmitting ACK/NACK corresponding to the alone downlink subframe with index 4 in Scell is the uplink subframe with index 2 in Pcell. When the value of k is 6, the timing position for transmitting ACK/NACK corresponding to the alone downlink subframe with index 7 in Scell is the uplink subframe with index 3 in Pcell, and the timing position for transmitting ACK/NACK corresponding to the alone downlink subframe with index 8 in Scell is the uplink subframe with index 4 in Pcell. When the value of k is 5, the timing position for transmitting ACK/NACK corresponding to the alone downlink subframe with index 3 in Scell is the uplink subframe with index 8 in Pcell. Assuming that Scell uses the fifth uplink/downlink configuration, according to timing position for transmitting ACK/NACK configured for the common subframe above, the timing position for transmitting ACK/NACK corresponding to the subframe with index 3 is the same as that for transmitting ACK/NACK corresponding to the common subframe with index 3, i.e., the uplink subframe with index 8 in Pcell.

TABLE 11

| Pcell configuration | Pcell uplink subframe index n | | | | | | | | | |
|---|---|---|---|---|---|---|---|---|---|---|
| serial number | 0 | 1 | 2 | 3 | 4 | 5 | 6 | 7 | 8 | 9 |
| 0 | — | — | 5 | 5, 4 | — | — | — | — | 4 | 4 | — |
| 1 | — | — | 5 | 5 | — | — | — | — | 5 | — |
| 2 | — | — | 5 | — | — | — | — | — | — | — |
| 3 | — | — | — | 10 | 10 | — | — | — | — | — |
| 4 | — | — | 9 | — | — | — | — | — | — | — |
| 5 | — | — | — | — | — | — | — | — | — | — |
| 6 | — | — | 8 | 6 | 6 | — | — | — | 5 | — |

Corresponding to Table 7 as above, i.e., when all the three principles are considered, the second way may determine first the sequence of corresponding timing positions for transmitting ACK/NACK according to sequence of timing positions of all uplink subframes and common subframes in Pcell. On the basis of guaranteeing principle ③, it is guaranteed as much as possible that timing positions for transmitting ACK/NACK corresponding to all downlink subframes and common subframes of Pcell are evenly distributed among uplink subframes in Pcell to the most extent, and it is guaranteed that the duration between timing position of the common subframe and corresponding timing position for transmitting ACK/NACK is greater than or equal to the minimum duration of UE's processing data. Assuming that index of an uplink subframe in Pcell is n, n−k denotes index of an alone subframe in Scell. Table 12 shows values of k in such conditions. Similarly, the value of k should be as small as possible under the satisfied conditions.

TABLE 12

| Pcell configuration | Pcell uplink subframe index n | | | | | | | | | |
|---|---|---|---|---|---|---|---|---|---|---|
| serial number | 0 | 1 | 2 | 3 | 4 | 5 | 6 | 7 | 8 | 9 |
| 0 | — | — | 5 | 5, 4 | — | — | — | — | 4 | 4 | — |
| 1 | — | — | 5 | 5 | — | — | — | — | 5 | — |
| 2 | — | — | 5 | — | — | — | — | — | — | — |
| 3 | — | — | 9, 8 | — | — | — | — | — | — | — |
| 4 | — | — | 9 | — | — | — | — | — | — | — |
| 5 | — | — | — | — | — | — | — | — | — | — |
| 6 | — | — | 8 | 6 | 6 | — | — | — | 5 | — |

The situation when frame edges of multiple cells are unaligned is considered below.

Figure 6:
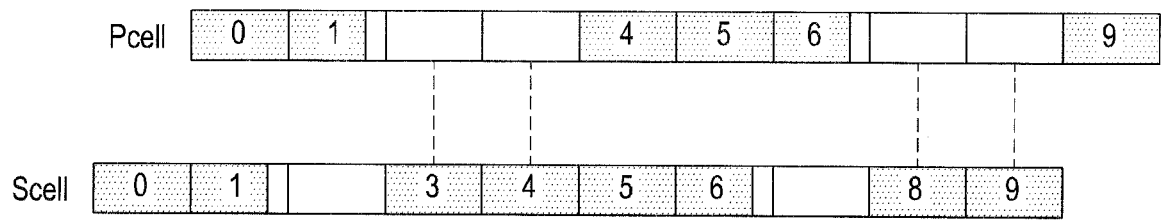
FIG. 6 is a diagram illustrating Pcell subframes and Scell subframes when cell frame edges are unaligned according to a first embodiment of the present invention.

FIG. 6 is a diagram illustrating Pcell subframes and Scell subframes when cell frame edges are unaligned according to a first embodiment of the present invention.

Referring to FIG. 6, at the timing position of any subframe in Pcell, the timing position may be a downlink subframe in Scell. As shown in FIG. 6, each timing position corresponding to four uplink subframes in Pcell are also downlink subframes in Scell. So assuming that Pcell comprises D downlink subframes and U uplink subframes, it is needed to determine timing positions for transmitting ACK/NACK corresponding to timing positions of all the U uplink subframes. Those subframes in Scell at timing positions of the U uplink subframes in Pcell are taken as common subframes.

On the basis of satisfying principle ①, a combination of several configuration principles may be selected.

Corresponding to Table 8 as above, i.e., when only configuration principle ① is considered, as to timing positions of the common subframes, assuming that index of an uplink subframe in Pcell is n, and the index of a common subframe is n–k, Table 13 shows values of k under such conditions. The value of k should be as small as possible on the basis of satisfying principle ①.

Taking the sixth uplink/downlink configuration for example, values of k in Table 13 are mostly the same as that in Table 8, except that when the value of k is 5 in Table 13, because there is a common subframe with index 2 added, the timing position for transmitting ACK/NACK corresponding to common subframe with index 2 is the uplink subframe with index 7 in Pcell.

TABLE 13

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5, 4 | 4 | — | — | — | 5, 4 | 4 | — |
| 1 | — | — | 5, 4 | — | — | — | — | 5, 4 | — | — |
| 2 | — | — | 5 | — | — | — | — | 5 | — | — |
| 3 | — | — | 10, 9, 8 | — | — | — | — | — | — | — |
| 4 | — | — | 10, 9 | — | — | — | — | — | — | — |
| 5 | — | — | 10 | — | — | — | — | — | — | — |
| 6 | — | — | 5, 4 | — | — | — | — | 5, 4 | 4 | — |

Corresponding to Table 9 as above, i.e., when configuration principles ③ and ① are considered, assuming that index of an uplink subframe in Pcell is n, and the index of a common subframe is n–k, Table 14 shows values of k under such condition. The value of k should be as small as possible on the basis of satisfying the principles.

Taking the sixth uplink/downlink configuration for example, the values of k in Table 14 are mostly the same as that in Table 9, except that when the value of k is 6 in Table 14, because there is a common subframe with index 2 added, the timing position for transmitting ACK/NACK corresponding to common subframe with index 2 is the uplink subframe with index 8 in Pcell.

TABLE 14

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5, 4 | 4 | — | — | — | 5, 4 | 4 | — |
| 1 | — | — | 5, 4 | — | — | — | — | 5, 4 | — | — |
| 2 | — | — | 5 | — | — | — | — | 5 | — | — |
| 3 | — | — | 10, 9, 8 | — | — | — | — | — | — | — |
| 4 | — | — | 10, 9 | — | — | — | — | — | — | — |
| 5 | — | — | 10 | — | — | — | — | — | — | — |
| 6 | — | — | — | 6, 5 | — | — | — | — | 6, 5, 4 | — |

Corresponding to Table 10 as above, i.e., when configuration principles ② and ① are considered, assuming that the index of an uplink subframe in Pcell is n, and the index of a common subframe is n–k, Table 15 shows values of k under such condition. The value of k should be as small as possible on the basis of satisfying the principles.

Taking the sixth uplink/downlink configuration for example, indexes of uplink subframes in Pcell are 2, 3, 4, 7 and 8, so subframes in Scell at the timing position of uplink subframes with index 3, 4, 7 and 8 in Pcell are taken as common subframes, and the corresponding timing positions for transmitting ACK/NACK should be configured. It is assumed that the value of k is greater than or equal to 4, which meets the requirement of minimum duration of UE's processing data in LTE. When the value of k is 8, the timing position for transmitting ACK/NACK corresponding to the common downlink subframe with index 4 is the uplink subframe with index 2 in Pcell. When the value of k is 6, the timing position for transmitting ACK/NACK corresponding to the common downlink subframe with index 7 is the uplink subframe with index 3 in Pcell, the timing position for transmitting ACK/NACK corresponding to the common downlink subframe with index 8 is the uplink subframe with index 4 in Pcell, when value of k is 5, the timing position for transmitting ACK/NACK corresponding to the common downlink subframe with index 2 is the uplink subframe with index 7 in Pcell, and the timing position for transmitting ACK/NACK corresponding to the common downlink subframe with index 3 is the uplink subframe with index 8 in Pcell. Assuming that Scell uses the fifth uplink/downlink configuration, according to the timing position for transmitting ACK/NACK configured for the common subframe above, the timing position for transmitting ACK/NACK corresponding to the subframe with index 3 is the same as that for transmitting ACK/NACK corresponding to the common subframe with index 3, i.e., the uplink subframe with index 8 in Pcell.

TABLE 15

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5 | 5, 4 | — | — | — | 5 | 5, 4 | — |
| 1 | — | — | 5 | 5 | — | — | — | 5 | 5 | — |
| 2 | — | — | 5 | — | — | — | — | 5 | — | — |
| 3 | — | — | 10 | 10 | 10 | — | — | — | — | — |
| 4 | — | — | 10 | 10 | — | — | — | — | — | — |
| 5 | — | — | 10 | — | — | — | — | — | — | — |
| 6 | — | — | 8 | 6 | 6 | — | — | 5 | 5 | — |

Corresponding to Table 11 as above, i.e., when all three configuration principles are considered, the first way may guarantee first that timing positions for transmitting ACK/NACK corresponding to all downlink subframes are evenly distributed among uplink subframes in Pcell to the most extent. On the basis of guaranteeing principle ②, it is guaranteed as much as possible that for timing positions of all the downlink subframes of Pcell and common subframes, the sequence of corresponding timing positions for transmitting ACK/NACK is determined according to sequence of these timing positions, and it is guaranteed that the duration between timing position of the common subframe and corresponding timing position for transmitting ACK/NACK is greater than or equal to the minimum duration of UE's processing data. Assuming that the index of an uplink subframe in Pcell is n, and the index of an alone subframe is n–k, Table 16 shows values of k under such conditions.

The value of k should be as small as possible on the basis of satisfying the above principles.

Taking the sixth uplink/downlink configuration for example, the values of k in Table 16 are mostly the same as that in Table 11, except that when value of k is 5 in Table 16, because there is a common subframe with index 2 added, the timing position for transmitting ACK/NACK corresponding to common subframe with index 2 is the uplink subframe with index 7 in Pcell.

TABLE 16

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5 | 5, 4 | — | — | — | 5 | 5, 4 | — |
| 1 | — | — | 5 | 5 | — | — | — | 5 | 5 | — |
| 2 | — | — | 5 | — | — | — | — | 5 | — | — |
| 3 | — | — | 10 | 10 | 10 | — | — | — | — | — |
| 4 | — | — | 10 | 10 | — | — | — | — | — | — |
| 5 | — | — | 10 | — | — | — | — | — | — | — |
| 6 | — | — | 8 | 6 | 6 | — | — | 5 | 5 | — |

Corresponding to Table 12 as above, i.e., when all the three principles are considered, the second way may determine first the sequence of corresponding timing positions for transmitting ACK/NACK according to sequence of timing positions of all uplink subframes and common subframes in Pcell. On the basis of guaranteeing principle ③, it is guaranteed as much as possible that timing positions for transmitting ACK/NACK corresponding to all downlink subframes and common subframes of Pcell are evenly distributed among uplink subframes in Pcell to the most extent, and it is guaranteed that the duration between timing position of the common subframe and corresponding timing position for transmitting ACK/NACK is greater than or equal to the minimum duration of UE's processing data. Assuming that the index of an uplink subframe in Pcell is n, the index of a common subframe is n–k, and Table 17 shows the values of k in such conditions. The value of k should be as small as possible under the satisfied conditions.

TABLE 17

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5 | 5, 4 | — | — | — | 5 | 5, 4 | — |
| 1 | — | — | 5 | 5 | — | — | — | 5 | 5 | — |
| 2 | — | — | 5 | — | — | — | — | 5 | — | — |
| 3 | — | — | 10, 9, 8 | — | — | — | — | — | — | — |
| 4 | — | — | 10, 9 | — | — | — | — | — | — | — |
| 5 | — | — | 10 | — | — | — | — | — | — | — |
| 6 | — | — | 8 | 6 | 6 | — | — | 5 | 5 | — |

Second Exemplary Embodiment

In the second exemplary embodiment of the preset invention, in view of Pcell, the timing position for transmitting ACK/NACK in a cell is multiplexed with the same uplink and downlink configuration in LTE and LTE-A. timing positions for transmitting ACK/NACK are reconfigured corresponding to all downlink subframes in Scell, rather than multiplex the configuration result in Pcell directly.

In view of all downlink subframes in Scell, the principles for configuring corresponding timing positions for transmitting ACK/NACK are similar to the above mentioned principles ① to principle ③. On the basis of comprising principle ① at least, any of the several principles may be taken into consideration at the same time.

Based on the above configuration principles, there are two methods for configuring ACK/NACK timing relations in view of all downlink subframes in Scell.

First, according to the 7 kinds of uplink/downlink configurations a TDD system supports, in view of each possible combination of uplink/downlink configurations of Pcell and Scell, timing positions for transmitting ACK/NACK are configured corresponding to all downlink subframes of Scell. If the frame edge of Pcell and that of Scell are unaligned, the relative subframe offset should be further considered when configuring the timing relations. Take the situation that frame edges of multiple cells are aligned for example.

Take the situation that only the above mentioned three principles are taken into consideration. Assuming that index of an uplink subframe in Pcell is n and index of a downlink subframe in Scell is n–k, Table 18 shows values of k above in such cases.

TABLE 18

| Pcell configuration serial number | Scell configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| 0 | 0 | — | — | 6 | — | 4 | — | — | 6 | — | 4 |
| | 1 | — | — | 6 | 4 | 4 | — | — | 6 | 4 | 4 |
| | 2 | — | — | 6, 4 | 4 | 4 | — | — | 6, 4 | 4 | 4 |
| | 3 | — | — | 6, 5 | 5, 4 | 4 | — | — | 6 | — | 4 |
| | 4 | — | — | 6, 5 | 5, 4 | 4 | — | — | 6 | 4 | 4 |
| | 5 | — | — | 6, 5 | 5, 4 | 4 | — | — | 6, 4 | 4 | 4 |
| | 6 | — | — | 6 | 4 | 4 | — | — | 6 | — | 4 |
| 1 | 1 | — | — | 7, 6 | 4 | — | — | — | 7, 6 | 4 | — |
| | 0 | — | — | 7 | 7 | — | — | — | 7 | 7 | — |
| | 2 | — | — | 7, 6 | 5, 4 | — | — | — | 7, 6 | 5, 4 | — |
| | 3 | — | — | 7, 6 | 6, 5 | — | — | — | 8, 7 | 7 | — |
| | 4 | — | — | 7, 6 | 6, 5 | — | — | — | 8, 7 | 7, 4 | — |
| | 5 | — | — | 7, 6, 5 | 5, 4 | — | — | — | 7, 6 | 5, 4 | — |
| | 6 | — | — | 7, 6 | 4 | — | — | — | 7 | 7 | — |
| 2 | 2 | — | — | 8, 7, 4, 6 | — | — | — | — | 8, 7, 4, 6 | — | — |
| | 0 | — | — | 7, 6 | — | — | — | — | 7, 6 | — | — |
| | 1 | — | — | 8, 7, 6 | — | — | — | — | 8, 7, 6 | — | — |
| | 3 | — | — | 7, 5, 4, 6 | — | — | — | — | 8, 7, 6 | — | — |

TABLE 18-continued

| Pcell configuration serial number | Scell configuration serial number | Pcell uplink subframe index n | | | | | | | | | |
|---|---|---|---|---|---|---|---|---|---|---|---|
| | | 0 | 1 | 2 | 3 | 4 | 5 | 6 | 7 | 8 | 9 |
| | 4 | — | — | 8, 7, 6, 5 | — | — | — | — | 9, 8, 7, 6 | — | — |
| | 5 | — | — | 8, 7, 6, 5, 4 | — | — | — | — | 8, 7, 4, 6 | — | — |
| | 6 | — | — | 7, 6 | — | — | — | — | 8, 7, 6 | — | — |
| 3 | 3 | — | — | 7, 6, 11 | 6, 5 | 5, 4 | — | — | — | — | — |
| | 0 | — | — | 7, 11 | 7 | 4 | — | — | — | — | — |
| | 1 | — | — | 8, 11 | 8, 7 | 5, 4 | — | — | — | — | — |
| | 2 | — | — | 9, 8, 11 | 8, 7, 5 | 5, 4 | — | — | — | — | — |
| | 4 | — | — | 8, 7, 11 | 7, 6, 5 | 5, 4 | — | — | — | — | — |
| | 5 | — | — | 9, 8, 11 | 8, 7, 6 | 6, 5, 4 | — | — | — | — | — |
| | 6 | — | — | 7, 11 | 7, 4 | 4 | — | — | — | — | — |
| 4 | 4 | — | — | 12, 8, 7, 11 | 6, 5, 4, 7 | — | — | — | — | — | — |
| | 0 | — | — | 12, 11 | 8, 7 | — | — | — | — | — | — |
| | 1 | — | — | 12, 8, 11 | 8, 4, 7 | — | — | — | — | — | — |
| | 2 | — | — | 12, 9, 8, 11 | 8, 5, 4, 7 | — | — | — | — | — | — |
| | 3 | — | — | 12, 7, 6, 11 | 6, 5, 4 | — | — | — | — | — | — |
| | 5 | — | — | 12, 9, 8, 7, 11 | 6, 5, 4, 7 | — | — | — | — | — | — |
| | 6 | — | — | 12, 7, 11 | 4, 7 | — | — | — | — | — | — |
| 5 | 5 | — | — | 13, 12, 9, 8, 7, 5, 4, 11, 6 | — | — | — | — | — | — | — |
| | 0 | — | — | 12, 7, 11, 6 | — | — | — | — | — | — | — |
| | 1 | — | — | 13, 12, 8, 7, 11, 6 | — | — | — | — | — | — | — |
| | 2 | — | — | 13, 12, 9, 8, 7, 4, 11, 6 | — | — | — | — | — | — | — |
| | 3 | — | — | 13, 12, 7, 5, 4, 11, 6 | — | — | — | — | — | — | — |
| | 4 | — | — | 13, 12, 8, 7, 5, 4, 11, 6 | — | — | — | — | — | — | — |
| | 6 | — | — | 13, 12, 7, 11, 6 | — | — | — | — | — | — | — |
| 6 | 6 | — | — | 7 | 7 | 5 | — | — | 7 | 7 | — |
| | 0 | — | — | 7 | 7 | 4 | — | — | 6 | — | — |
| | 1 | — | — | 7, 6 | 4 | 4 | — | — | 6 | 4 | — |
| | 2 | — | — | 7, 6 | 5, 4 | 4 | — | — | 6, 4 | 4 | — |
| | 3 | — | — | 7, 6 | 6, 5 | 5, 4 | — | — | 6 | — | — |
| | 4 | — | — | 7, 6 | 6, 5 | 5, 4 | — | — | 6 | 4 | — |
| | 5 | — | — | 7, 6 | 6, 5 | 5, 4 | — | — | 6, 4 | 4 | — |

Second, in view of each uplink/downlink configuration, considering each kind of uplink/downlink configuration applied in Pcell no matter which uplink/downlink configuration is used by Scell, a common ACK/NACK timing position may be configured corresponding to an alone downlink subframe of Scell. Because there are seven kinds of TDD uplink/downlink configurations in LTE/LTE-A, this method only requires to configure seven kinds of ACK/NACK timing relations in view of Scell correspondingly.

The situation when frame edges of multiple cells are aligned is considered first, the same as introduced in embodiment 1: the subframe with index 2 must be an uplink subframe, so no matter which configuration is used, the downlink subframe in Scell will not be at the timing position of the subframe with index 2. Considering such situation, in this method, the subframes in Scell at timing positions of the U-1 uplink subframes in Pcell except the subframe with index 2 are taken as common subframes, and common ACK/NACK timing relations are reconfigured. In fact, this method corresponds to the assumption that Scell uses the fifth uplink/downlink configuration to configure common ACK/NACK timing relations, and apply the common ACK/NACK timing relations to other uplink/downlink configurations.

Take the example that the above mentioned three principles are considered only. Assuming that the index of an uplink subframe in Pcell is n, n–k denotes the index of a common subframe. Table 19 shows values of k in such conditions. The value of k should be as small as possible under the satisfied conditions.

TABLE 19

| Pcell configuration serial number | Pcell uplink subframe index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 4 | 4 | 4 |
| 1 | — | — | 7, 6, 5 | 5, 4 | — | — | — | 7, 6 | 5, 4 | — |
| 2 | — | — | 8, 7, 5, 4, 6 | — | — | — | — | 8, 7, 4, 6 | — | — |
| 3 | — | — | 9, 8, 11 | 8, 7, 6 | 6, 5, 4 | — | — | — | — | — |
| 4 | — | — | 12, 9, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7, 6 | 6, 5 | 5, 4 | — | — | 6, 4 | 4 | — |

The situation when frame edges of multiple cells are unaligned is considered below. At the timing position of any subframe in Pcell, the timing position may be a downlink subframe in Scell, so assuming that Pcell comprises D downlink subframes and U uplink subframes, it is needed to determine timing positions for transmitting ACK/NACK corresponding to timing positions of all the U uplink subframes. Those subframes in Scell at timing positions of the U uplink subframes in Pcell are taken as common subframes.

Take the example that the above mentioned three principles are considered only, Assuming that index of an uplink subframe in Pcell is n, n–k denotes index of a common subframe. Table 20 shows values of k in such conditions. The value of k should be as small as possible under the satisfied condition.

downlink subframe with index 4 in Scell is scheduled by the PDCCH transmitted by the downlink subframe with index 1 in Pcell, so the timing position for transmitting ACK/NACK corresponding to the downlink subframe with index 4 in Scell should be the same as the timing position for transmitting ACK/NACK corresponding to the downlink subframe with index 1 in Pcell, but it is the uplink subframe with index 7 in Pcell at the timing position of the feecback ACK/NACK corresponding to the downlink subframe with index 1 in Pcell, and the duration between the uplink subframe with index 7 in Pcell and the downlink subframe with index 4 in Scell is 3 ms, which does not meet the requirement of minimum duration of UE's processing data in LTE. In order to address this issue, it may be limited that the base station only schedules those downlink subframes in Scell whose ACK/NACK timing positions may meet the

TABLE 20

| Pcell configuration serial number | Pcell uplink subframe index n | | | | | | | | |
|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6, 5 | 5, 4 | — | — | — | 7, 6, 5 | 5, 4 | — |
| 2 | — | — | 8, 7, 6, 5, 4 | — | — | — | — | 8, 7, 6, 5, 4 | — | — |
| 3 | — | — | 11, 10, 9, 8 | 8, 7, 6 | 6, 5, 4 | — | — | — | — | — |
| 4 | — | — | 12, 11, 10, 9, 8 | 8, 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 7, 6 | 6, 5 | 5, 4 | — | — | 6, 5 | 5, 4 | — |

According to an exemplary embodiment of the present invention, when multiple cells in CA use different uplink/downlink configurations and the base station schedules downlink subframes in Scell through downlink subframes in Pcell, i.e., using cross-carrier scheduling, the UE may use another method to transmit ACK/NACK, which will be introduced briefly hereinafter.

ACK/NACK timing relations corresponding to downlink subframes in Pcell are stored in UE in advance, as shown in Table 2. After receiving PDSCH of Scell, UE determines the downlink subframes of Pcell in which PDCCH of this PDSCH is located, and according to Table 2, obtains timing positions for transmitting ACK/NACK corresponding to the determined downlink subframes, and transmits ACK/NACK at corresponding ACK/NACK timing position of Pcell.

Figure 7:
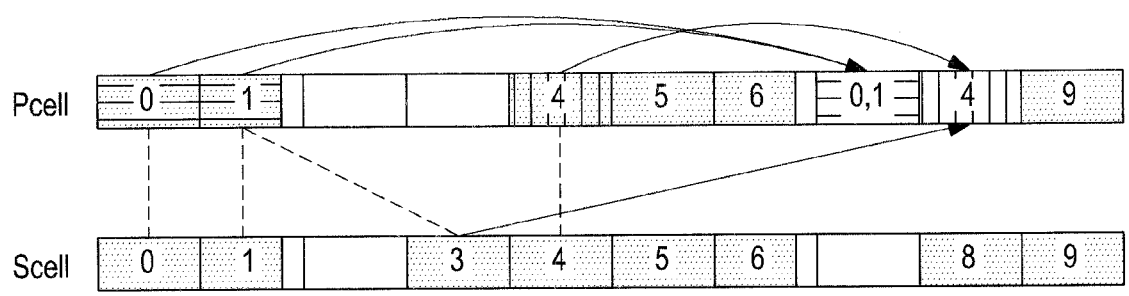
FIG. 7 is a diagram illustrating the process of determining the timing position for transmitting ACK/NACK according to Physical Downlink Shared Channel (PDSCH), according to a first exemplary embodiment of the present invention.

FIG. 7 is a diagram illustrating the process of determining the timing position for transmitting ACK/NACK according to Physical Downlink Shared Channel (PDCCH), according to a first exemplary embodiment of the present invention.

Referring to FIG. 7, and using FIG. 4 as an example, PDSCH transmitted by the downlink subframe with index 3 in Scell is scheduled by PDCCH in the downlink subframe with index 1 in Pcell. As shown in FIG. 7, the timing position for transmitting ACK/NACK corresponding to the downlink subframe with index 3 in Scell is the same as the timing position for transmitting ACK/NACK corresponding to the downlink subframe with index 1 in Pcell, i.e., located in the uplink subframe with index 7 in Pcell.

Figure 8:
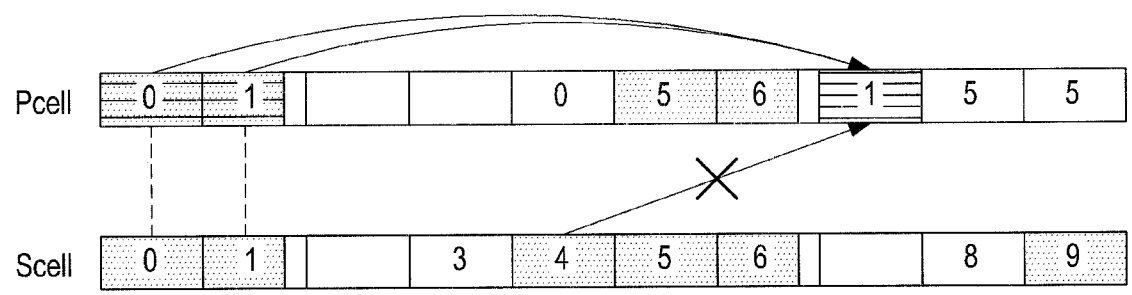
FIG. 8 is a diagram illustrating the process of determining the timing position for transmitting ACK/NACK not according to PDCCH, according to a first exemplary embodiment of the present invention.

FIG. 8 is a diagram illustrating the process of determining the timing position for transmitting ACK/NACK not according to PDCCH, according to a first exemplary embodiment of the present invention.

Referring to FIG. 8, this method cannot deal with situations of all uplink/downlink configurations. In the frame structure as shown in FIG. 8, the PDSCH transmitted by the requirement of minimum duration of UE's processing data, like in FIG. 8. The base station may be prevented from scheduling the downlink subframe with index 4 in Scell. But this method actually limits that the downlink subframe with index 4 in Scell cannot be used for PDSCH transmission, so that cannot maximize peak rate of UE.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A method for transmitting an acknowledgement signal by a user equipment (UE) in a wireless communication system using carrier aggregation (CA), the method comprising:
   receiving a physical downlink control channel (PDCCH) signal in a primary cell (Pcell), or a secondary cell (Scell);
   receiving data on a physical downlink shared channel (PDSCH) scheduled by the PDCCH signal; and
   transmitting an acknowledgement signal in response to reception of the data in a timing position,
   wherein the timing position is identified based on a reference uplink (UL)/downlink (DL) configuration on the Pcell or the Scell,
   wherein the reference UL/DL configuration is identified by selecting one of a plurality of UL/DL configurations based on a pair formed by a Pcell UL/DL configuration and a Scell UL/DL configuration in a time division duplexing (TDD) mode, in case that the Pcell UL/DL configuration and the Scell UL/DL configuration are different and a serving cell of the UE is the Scell, wherein the reference UL/DL configuration is the Pcell UL/DL configuration in the TDD mode, in case that the Pcell UL/DL configuration and the Scell UL/DL configuration are different and a serving cell of the UE is the Pcell, wherein the timing position is identified based on timing positions of UL subframes according to the Pcell UL/DL configuration, and wherein, if frame edges of the Pcell correspond to frame edges of the Scell, the timing position is identified based on timing positions of UL subframes except for a UL subframe with a set index of UL subframes according to the Pcell UL/DL configuration, and a timing position of the UL subframe with the set index is different from a timing position of each DL subframe in the Scell.

2. The method according to claim 1, wherein the timing position comprises a timing position corresponding to a DL subframe in the Scell.

3. The method according to claim 1, wherein a timing position of the acknowledgement signal corresponding to a DL subframe in the Scell is identified based on a timing position of the acknowledgement signal corresponding to a DL subframe in the Pcell.

4. The method according to claim 1, wherein the timing position is identified based on a data processing time of the UE.

5. The method according to claim 1, wherein, in case that frame edges of the Pcell do not correspond to frame edges of the Scell, the timing position is identified based on timing positions of UL subframes according to the Pcell UL/DL configuration.

6. A user equipment (UE) for transmitting an acknowledgement signal in a wireless communication system using carrier aggregation (CA), the UE comprising:
a transceiver; and
a controller configured to control the transceiver, wherein the controller is configured to:
receive a physical downlink control channel (PDCCH) signal in a primary cell (Pcell), or a secondary cell (Scell);
receive data on a physical downlink shared channel (PDSCH) scheduled by the PDCCH signal; and
transmit an acknowledgement signal in response to reception of the data in a timing position,
wherein the timing position is identified based on a reference uplink (UL)/downlink (DL) configuration on the Pcell or the Scell,
wherein the reference UL/DL configuration is identified by selecting one of a plurality of UL/DL configurations based on a pair formed by a Pcell UL/DL configuration and a Scell UL/DL configuration in a time division duplexing (TDD) mode, in case that the Pcell UL/DL configuration and the Scell UL/DL configuration are different and a serving cell of the UE is the Scell,
wherein the reference UL/DL configuration is the Pcell UL/DL configuration in the TDD mode, in case that the Pcell UL/DL configuration and the Scell UL/DL configuration are different and the serving cell of the UE is the Pcell, wherein the timing position is identified based on timing positions of UL subframes according to the Pcell UL/DL configuration, and wherein, if frame edges of the Pcell correspond to frame edges of the Scell, the timing position is identified based on timing positions of UL subframes except for a UL subframe with a set index of UL subframes according to the Pcell UL/DL configuration, and a timing position of the UL subframe with the set index is different from a timing position of each DL subframe in the Scell.

7. The UE according to claim 6, wherein the timing position comprises a timing position corresponding to a DL subframe in the Scell.

8. The UE according to claim 6, wherein a timing position of the acknowledgement signal corresponding to a DL subframe in the Scell is identified based on a timing position of the acknowledgement signal corresponding to a DL subframe in the Pcell.

9. The UE according to claim 6, wherein, in case that frame edges of the Pcell do not correspond to frame edges of the Scell, the timing position is identified based on timing positions of UL subframes according to the Pcell UL/DL configuration.

10. The method according to claim 5, wherein the timing position is identified based on a relative subframe offset between the Pcell and the Scell.

11. The method according to claim 1, wherein timing positions for transmitting acknowledgement signals of data transmitted through DL subframes of the Scell are distributed within UL subframes of the Pcell.

12. The method according to claim 1, wherein a time duration between the timing position and a timing position at which the data is received is set based on data processing time of the UE.

13. The method according to claim 1, wherein the timing position is identified based on timing positions of the UL subframes except for a UL subframe with index 2 in the Pcell.

14. The UE according to claim 9, wherein the timing position is identifed based on a relative subframe offset between the Pcell and the Scell.

15. The UE according to claim 6, wherein timing positions for transmitting acknowledgement signals of data transmitted through DL subframes of the Scell are distributed within UL subframes of the Pcell.

16. The UE according to claim 6, wherein a time duration between the timing position and a timing position at which the data is received is set based on data processing time of the UE.

17. The UE according to claim 6, wherein the timing position is identified based on timing positions of the UL subframes except for a UL subframe with index 2 in the Pcell.

* * * * *